US012155152B2

(12) United States Patent
Guo et al.

(10) Patent No.: US 12,155,152 B2
(45) Date of Patent: Nov. 26, 2024

(54) HIGH-VOLTAGE CONNECTOR FOR ENERGY STORAGE

(71) Applicant: EVE ENERGY CO., LTD., Guangdong (CN)

(72) Inventors: Yanchun Guo, Guangdong (CN); Yintao Wei, Guangdong (CN); Yicheng Lu, Guangdong (CN); Guijie Lei, Guangdong (CN); Ming Liu, Guangdong (CN); Xiang Chen, Guangdong (CN); Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 650 days.

(21) Appl. No.: 17/601,361

(22) PCT Filed: Dec. 17, 2019

(86) PCT No.: PCT/CN2019/126043
§ 371 (c)(1),
(2) Date: Jul. 1, 2022

(87) PCT Pub. No.: WO2020/199653
PCT Pub. Date: Oct. 8, 2020

(65) Prior Publication Data
US 2022/0336997 A1    Oct. 20, 2022

(30) Foreign Application Priority Data

Apr. 4, 2019 (CN) .......................... 201910273034.0

(51) Int. Cl.
*H01R 13/53* (2006.01)
*H01R 13/447* (2006.01)
(Continued)

(52) U.S. Cl.
CPC ........... *H01R 13/53* (2013.01); *H01R 13/447* (2013.01); *H01R 13/502* (2013.01);
(Continued)

(58) Field of Classification Search
CPC .... H01R 13/53; H01R 13/447; H01R 13/502; H01R 13/5202; H01R 13/6272;
(Continued)

(56) References Cited

U.S. PATENT DOCUMENTS 5,433,623 A * 7/1995 Wakata ................. B60L 3/0069
439/310
5,820,409 A * 10/1998 Clark ...................... B60L 50/52
439/157
(Continued)

FOREIGN PATENT DOCUMENTS

CN            2753002 Y     1/2006
CN          201210555 Y     3/2009
(Continued)

OTHER PUBLICATIONS

International Search Report (PCT/CN2019/126043), dated Mar. 17, 2020.
(Continued)

*Primary Examiner* — Abdullah A Riyami
*Assistant Examiner* — Nelson R. Burgos-Guntin
(74) *Attorney, Agent, or Firm* — Hunton Andrews Kurth LLP

(57) ABSTRACT

Provided is a wiring device for a high-voltage connector for energy storage. The high-voltage connector for energy storage includes a socket and a plug. The socket comprises a socket body, a mounting flange, an electrical isolation groove, a fastening ring, a pin and an anti-electric shock cap. The plug comprises a plug main body, a pressing buckle, hand-held pluggable portions, a hammering boss, a jack, a (Continued)

crown spring, a wiring cup opening, and a locking slider, waterproof lock washer and protective back cover.

9 Claims, 5 Drawing Sheets

(51) Int. Cl.
- *H01R 13/502* (2006.01)
- *H01R 13/52* (2006.01)
- *H01R 13/627* (2006.01)
- *H01R 13/639* (2006.01)

(52) U.S. Cl.
CPC ..... *H01R 13/5202* (2013.01); *H01R 13/6272* (2013.01); *H01R 13/639* (2013.01)

(58) Field of Classification Search
CPC .... H01R 13/639; H01R 13/187; H01R 13/44; H01R 2101/00; H01R 4/70; H01R 4/72; H01R 13/627; H01R 13/629; H01R 24/00; Y02T 10/70
See application file for complete search history.

(56) References Cited

U.S. PATENT DOCUMENTS

| | | | | |
|---|---|---|---|---|
| 5,879,198 A * | 3/1999 | Sekimori | ............... | H01R 13/44 439/700 |
| 5,913,691 A * | 6/1999 | Clark | ............... | H01R 13/641 439/157 |
| 5,934,938 A * | 8/1999 | Clark | ............... | H01R 13/5208 439/275 |
| 6,213,799 B1 * | 4/2001 | Jazowski | ............... | H01R 13/53 439/181 |
| 8,968,021 B1 * | 3/2015 | Kennedy | ............... | H01R 13/641 439/352 |
| 2002/0129678 A1 * | 9/2002 | Beattie | ............... | H01R 13/53 81/53.1 |
| 2007/0026713 A1 * | 2/2007 | Hughes | ............... | H01R 13/53 439/181 |
| 2007/0259568 A1 * | 11/2007 | Mackillop | ............... | H01R 13/6477 439/638 |
| 2010/0136808 A1 * | 6/2010 | Vanzo | ............... | H01R 13/625 29/874 |
| 2011/0034053 A1 * | 2/2011 | Matsumoto | ............... | B60L 53/305 439/304 |
| 2011/0171843 A1 * | 7/2011 | Casses | ............... | B60L 53/16 29/426.1 |
| 2013/0029539 A1 * | 1/2013 | Frank | ............... | H01R 9/05 439/750 |
| 2013/0288543 A1 * | 10/2013 | Higuchi | ............... | H01R 13/434 439/744 |
| 2014/0377990 A1 * | 12/2014 | Saller | ............... | H01R 24/38 439/582 |
| 2019/0027871 A1 * | 1/2019 | Data | ............... | H01R 13/6596 |
| 2019/0123467 A1 * | 4/2019 | Simmonds | ............... | H01R 13/111 |
| 2019/0280433 A1 * | 9/2019 | Zhang | ............... | H01R 13/42 |
| 2022/0336997 A1 * | 10/2022 | Guo | ............... | H01R 13/53 |

FOREIGN PATENT DOCUMENTS

| | | |
|---|---|---|
| CN | 202276016 U | 6/2012 |
| CN | 202395236 U | 8/2012 |
| CN | 103078211 A | 5/2013 |
| CN | 203660175 U | 6/2014 |
| CN | 105576434 A | 5/2016 |
| CN | 205488768 U | 8/2016 |
| CN | 206195068 U | 5/2017 |
| CN | 206271942 U | 6/2017 |
| CN | 104917018 B | 10/2017 |
| CN | 108173083 A | 6/2018 |
| CN | 108232704 A | 6/2018 |
| CN | 208173900 U | 11/2018 |
| CN | 109193269 A | 1/2019 |
| CN | 208336664 U | 1/2019 |
| CN | 109301618 A | 2/2019 |
| CN | 109473816 A | 3/2019 |
| CN | 110112602 A | 8/2019 |
| JP | 2012-139040 A | 7/2012 |

OTHER PUBLICATIONS

Search Report (from parent application—CN 2019102730340).
Supplementary Search Report [First] (from parent application—CN 2019102730340).
Supplementary Search Report [Second] (from parent application—CN 2019102730340).

* cited by examiner

HIGH-VOLTAGE CONNECTOR FOR ENERGY STORAGE

CROSS-REFERENCES TO RELATED APPLICATIONS

This application is a national stage application filed under 35 U.S.C. 371 based on International Patent Application No. PCT/CN2019/126043, filed on Dec. 17, 2019, which claims priority to Chinese Patent Application No. 201910273034.0 filed Apr. 4, 2019, the disclosures of which are incorporated herein by reference in their entirety.

TECHNICAL FIELD

The present application relates to the field of connector, and in particular, to a high-voltage connector for energy storage.

BACKGROUND

Connectors, also known as plug connectors, sockets and joints, are devices that connect two active devices to transmit current or signals.

Connectors used for energy storage have lower requirements than connectors used in new energy electric vehicles. They do not require waterproofing and electromagnetic shielding, but they also have relatively high requirements for structure and safety, requiring the plug to be firmly plugged into the socket.

The traditional high-voltage connector for energy storage is not provided with a fastening-locking structure, and the male terminal and the female terminal of the connector are easily loosened after the male terminal is inserted in the female terminal.

The plug of the traditional high-voltage connector for energy storage is not provided with a hand-held pluggable portion, which results in no unstressed part on the plug. It is extremely difficult and time-consuming and laborious for the male terminal of the connector to insert in and separate from the female terminal.

Both of the male and female terminals of the traditional high-voltage connector for energy storage adopt a non-cylindrical structure, and neither of the male and female terminals have a circular cross-section. The male terminal and the female terminal cannot form a rotating shaft after the male terminal is inserted in the female terminal, and the entire plug cannot be rotated 360° along the rotating shaft to adjust the outgoing direction of the wire.

The plug and wire of the traditional high-voltage connector for energy storage are integrally formed, which is costly, requires accurate wire length, and is inconvenient for the after-sales service.

The socket of the traditional high-voltage connector for energy storage is not provided with an anti-electric shock cap, or the pin is higher than the socket body, or the crown spring in the hole of the plug is higher than the plug body, which cannot be ensured that the pins of the socket are not contacted by the charged body, that the pins of the positive and negative sockets are not short-circuited by the charged body, and that the human body is protected from electric shock.

In view of this, it is indeed necessary to optimize the socket and plug to provide an anti-electric shock high-voltage connector for energy storage with a fastening-locking structure, and a plug having a structure with a hand-held plug-in position, capable of being rotated 360° to adjust the outgoing direction of the wire, and separated from the wire.

SUMMARY

The present application provides, by optimizing the socket and plug, a high-voltage connector for energy storage with a fastening-locking structure, and a plug having a structure with a hand-held plug-in position, capable of being rotated 360° to adjust the outgoing direction of the wire, and separated from wire.

Embodiments of the present application provide a high-voltage connector for energy storage which includes a socket and a plug.

The socket includes a socket body, a mounting flange, an electrical isolation groove, a fastening ring, a pin and an anti-electric shock cap.

The fastening ring of the socket includes an annular bevel and an annular slot.

The plug includes a plug main body, a pressing buckle, hand-held pluggable portions, a hammering boss, a hole, a crown spring, a wiring cup opening, and a locking slider, waterproof lock washer and protective back cover.

The pressing buckle of the plug includes a pressing boss, a buckle, and an elastic resetting member, the protective back cover of the plug comprises a ridge portion and a hexagonal portion.

The socket body, the mounting flange, the electrical isolation groove the fastening ring and the pin of the socket are integrally formed, and after being integrally formed, are assembled with the anti-electric shock cap.

The plug body, the pressing buckle, the hand-held pluggable portion, the hammering boss, the hole, the crown spring and the wiring cup opening of the plug are integrally formed, and after being integrally formed, are assembled with the locking slider, the waterproof lock washer, and the protective rear cover.

The pressing buckle of the plug, the locking slider, and the fastening ring of the socket together form a fastening-locking structure.

The pressing buckle of the plug is located on the plug body, the locking slider of the plug is configured to be slidable in the plug body after being installed, the fastening ring of the socket is located on an outer cylinder of the socket body, and positions of the fastening ring and the anti-electric shock cap are disposed correspondingly.

In one embodiment, the hole of the plug and the pin of the socket adopt a cylindrical structure respectively and are respectively provided with a circular cross section. The pin and the hole form a rotating shaft after the pin is inserted into the hole. The entire plug rotates 360° along the rotating shaft to adjust the outgoing direction of the wire. At the same time, the buckle of the pressing buckle of the plug rotates along the fastening ring of the socket.

In one embodiment, the electrical isolation groove of the socket is located on an end surface of the socket body, and a position of the electrical isolation groove is opposite to the anti-electric shock cap. The electrical isolation groove increases the creepage distance, plays a role of electrical safety, and at the same time makes the appearance of the socket better.

In one embodiment, the anti-electric shock cap of the socket is installed on an end surface of the pin, and a position of the anti-electric shock cap and the fastening snap ring are disposed correspondingly. The anti-electric shock cap ensures that the pin of the socket is not contacted with the charged body, the short circuit between the positive electrode and the negative electrode the pin of the socket is not caused by a charged body between the positive electrode and the negative electrode, and the human body is protected from electric shock.

In one embodiment, the hand-held pluggable portions of the plug are located on two sides of the plug, two hand-held pluggable portions are provided, and one of the two hand-held pluggable portions is located on a left side of the plug, another of the two hand-held pluggable portions is located on a right side of the plug. The hand-held pluggable portions increase the force area of the hand grip and provide a better force point, which facilitates using fingers to insert and pull the plug, rather than relying solely on the friction generated between the fingers and the plug for plugging. Moreover, the plug is more aesthetic.

In one embodiment, the hammering boss of the plug is located on an end surface of the plug main body, and a position of the hammering boss is opposite to the hole. The hammering boss of the plug is hammered and fastened with a blunt tool such as a hammer.

In one embodiment, the waterproof lock washer of the plug is installed in a groove of the outer cylinder between the hand-held pluggable portions of the plug and external threads of the plug body. The waterproof lock washer is waterproof and anti-loosening between the plug main body and the protective back cover.

In one embodiment, an interior of the hexagonal portion of the protective back cover of the plug is provided with internal threads, and the internal threads of the protective back cover is threadedly connected with external threads of the plug body, and the protective back cover is installed and fastened to the plug body. The protective back cover has two fastening methods. The first fasting method is that the ridge portion is fastened by hand tightening, and the second fastening method is that the hexagonal portion is fastened with a wrench or other tools. When the protective back cover is fastened, the first fastening method, namely, hand-tightening, is preferred, and the second fastening method, namely, tool-fastening is used when the hand-tightening is not too tight.

In one embodiment, the plug is separated from a wire. The cost of the connector is low, the length of the wire is not necessary very accurate, and the after-sales service is more convenient. The wiring cup opening of the plug is used for connecting wires. Firstly, the wire is inserted into the wiring cup opening, then the wire production equipment or hydraulic tools are used to press the connection cup opening into a hexagon, and then the connection cup opening is wrapped with the insulating tape or heat shrinkable tubing to make the connection cup opening and the wire tightly integrated, that is, the plug and the wire are integratedly formed.

The hole of the plug is inserted into the pin of the socket and is engaged with the pin of the socket in an interference fit through the crown spring, which is an electrical connection, otherwise, is unplugging.

The pressing buckle of the plug is buckled to the fastening ring of the socket through the buckle, which is a fastening buckle, otherwise, is a fastening separation. The locking slider of the plug pushes from the plug to the socket, which is locking buckling; otherwise, is locking separation.

Compared with related art, this present application has at least the following advantages:

By optimizing the socket and the plug, an anti-electric shock high-voltage connector for energy storage is provided, which is provided with a fastening and locking structure, a plug having a hand-held plug-in position structure, capable of rotating 360° to adjust the wire outgoing direction, and separated from the wire.

| Reference list | |
|---|---|
| name | Reference |
| Connector | 1 |
| Socket | 10 |
| Socket body | 101 |
| Mounting flange | 102 |
| Electrical isolation groove | 103 |
| Fastening ring | 104 |
| Annular bevel | 104a |
| Annular slot | 104b |
| Pin | 105 |
| Anti-electric shock cap | 106 |
| Plug | 20 |
| Plug body | 201 |
| Pressing buckle | 202 |
| Pressing boss | 202a |
| Buckle | 202b |
| Elastic resetting member | 202c |
| Hand-held pluggable portion | 203 |
| Hammering boss | 204 |
| Hole | 205 |
| Crown spring | 206 |
| Wiring cup opening | 207 |
| Locking slider | 208 |
| Waterproof lock washer | 209 |
| Protective back cover | 210 |
| Ridge portion | 210a |
| Hexagon portion | 210b |

DETAILED DESCRIPTION

To facilitate a better understanding of the present application, a more complete description of the present application is provided below with reference to the drawings.

It should be noted that when an element is referred to as being "fixed to" another element, it can be directly on the other element or a central element may also be present. When an element is considered to be "connected" to another element, it can be directly connected to the other element or an intermediate element may be present at the same time. The terms "vertical", "horizontal", "left", "right" and similar expressions used herein are for illustrative purposes only, and do not mean that they are the only embodiments.

Unless otherwise defined, all technical and scientific terms used herein have the same meaning as commonly understood by engineering and technical personnel belonging to the technical field of the application. The terms used in the specification of the application herein are only for describing specific implementations, and are not intended to limit the application. As used herein, the term "and/or" includes any and all combinations of one or more related listed items.

Figure 1:
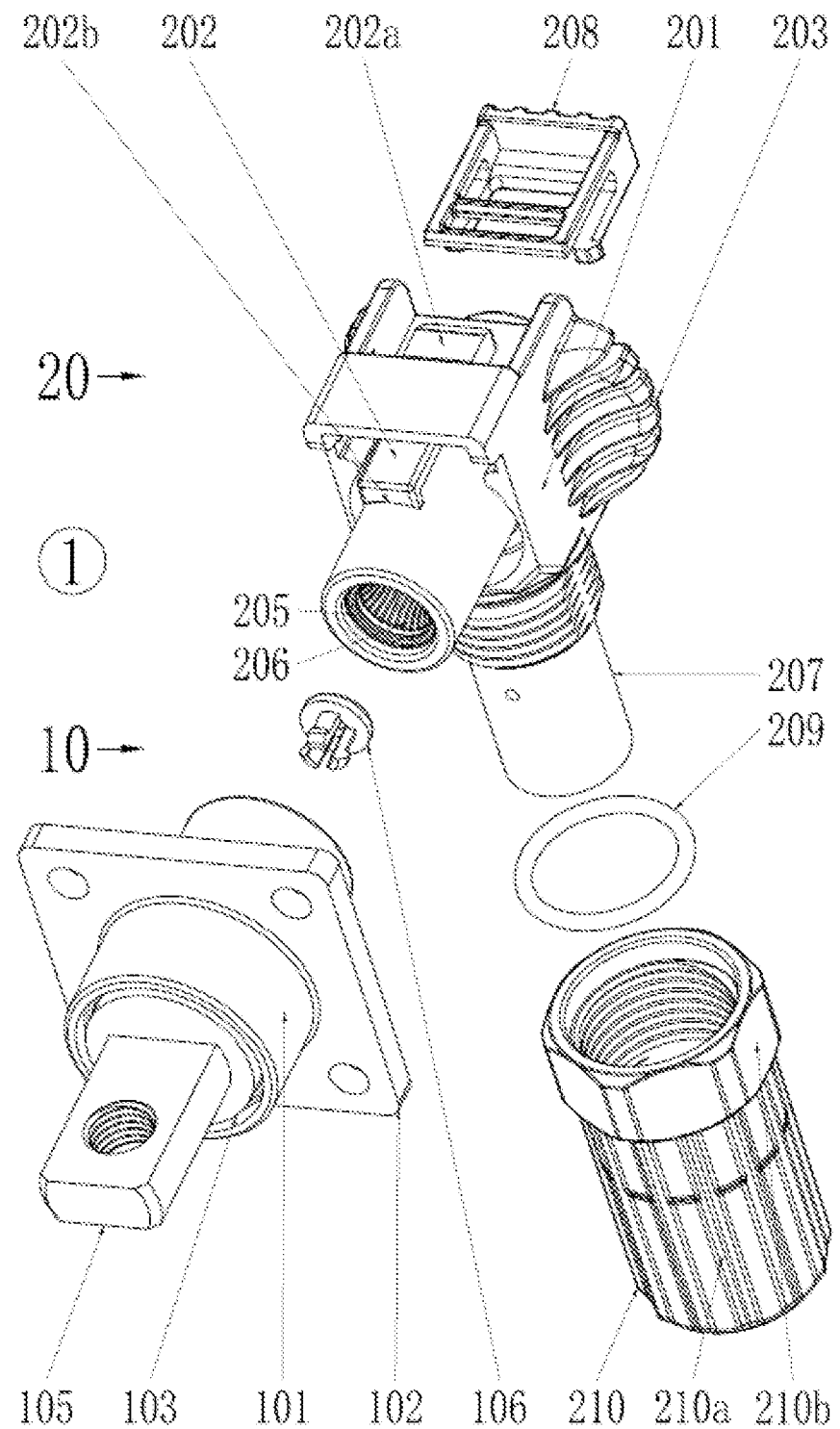
FIG. 1 is an exploded view of a high-voltage connector for energy storage of the present application.
Figure 2:
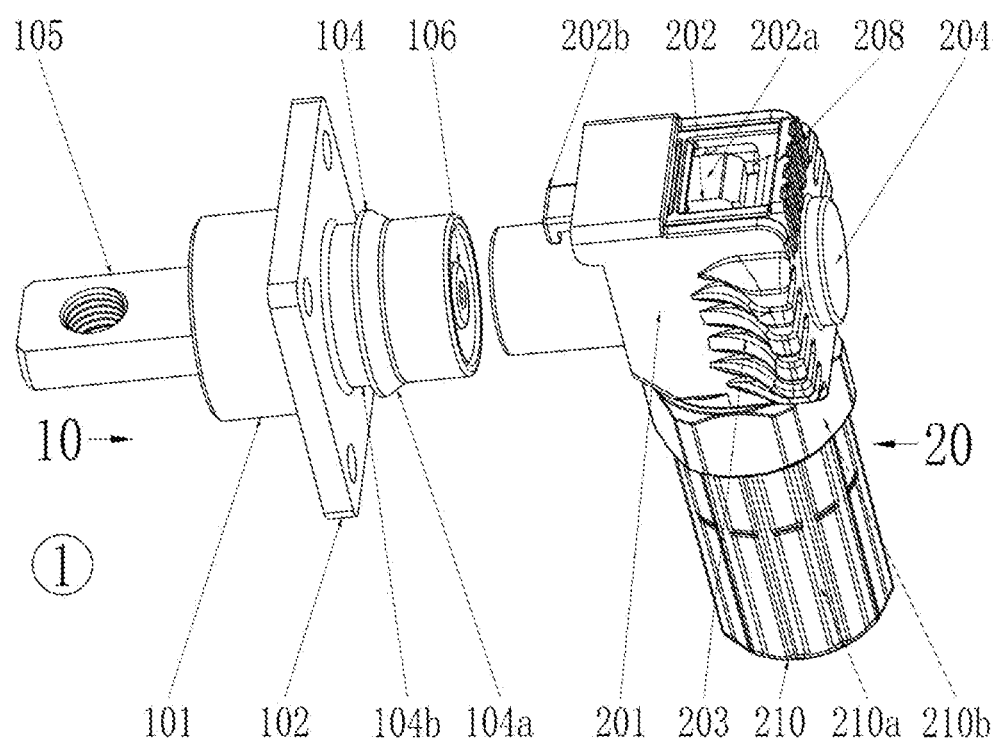
FIG. 2 is a perspective view in a separated state of a high-voltage connector for energy storage of the present application.
Figure 3:
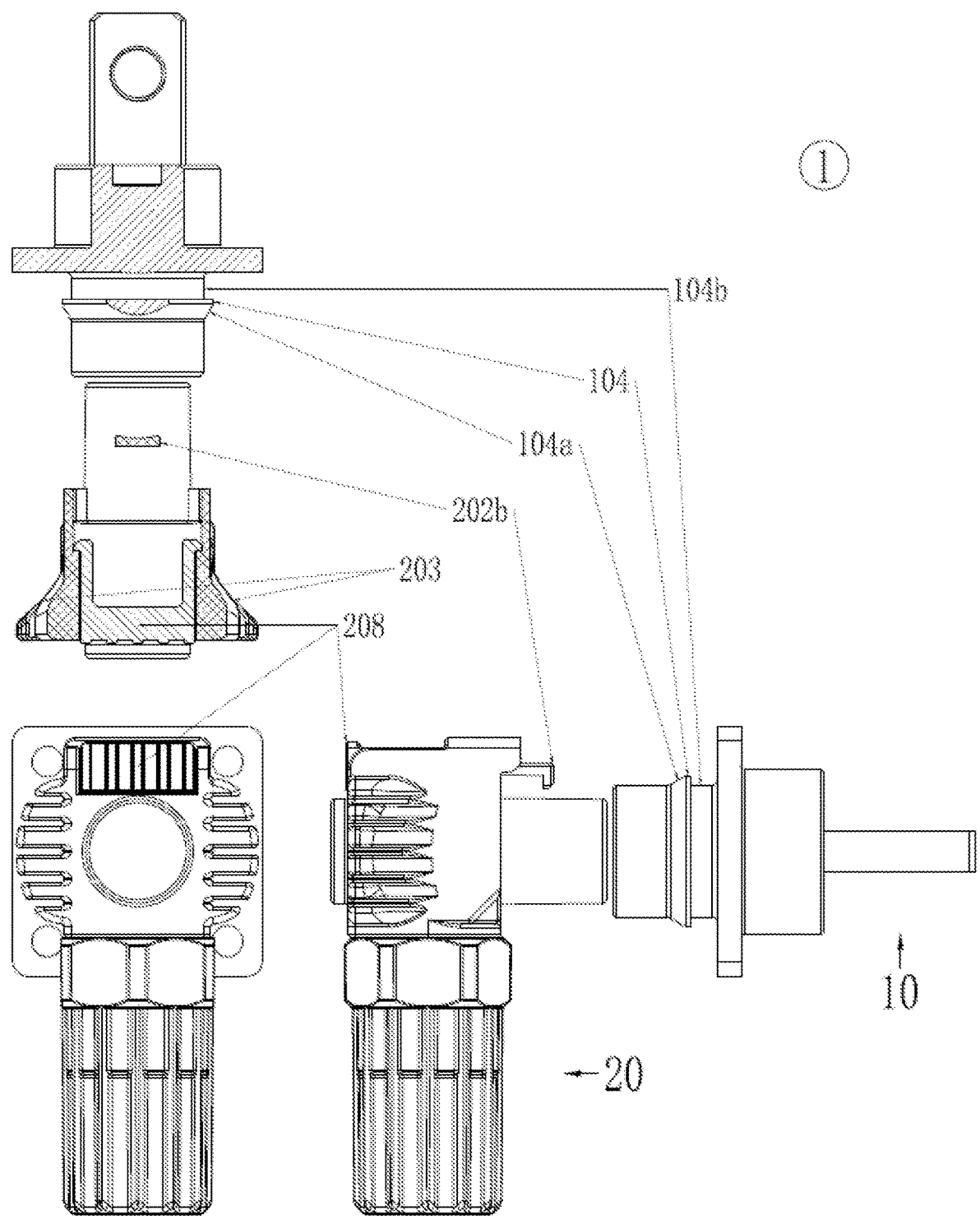
FIG. 3 is a three-plan view and a cross-sectional view in a separated state of the energy storage high-voltage connector of the present application.

Please refer to FIG. 1 and FIG. 2, a high-voltage connector for energy storage 1 that also called plug connector, includes a socket 10 and a plug 20. By optimizing the socket 10 and the plug 20 of the connector 1, the socket 10 is inserted to the plug 20 more firmly, and it avoids the looseness between the socket 10 and the plug 20.

Please refer to FIG. 1 and FIG. 2, the socket 10 includes a socket body 101, a mounting flange 102, an electrical isolation groove 103, a fastening ring 104, a pin 105 and an anti-electric shock cap 106. The pin 105 is a male terminal.

Please refer to FIG. 1 and FIG. 2, the plug 20 includes a plug main body 201, a pressing buckle 202, hand-held pluggable portions 203, a hammering boss 204, a hole 205, a crown spring 206, a wiring cup opening 207, and a locking slider 208, a waterproof lock washer 209 and a protective back cover 210. The hole 205 is a female terminal.

Please refer to FIG. 2, the fastening ring 104 of the socket 10 includes an annular bevel 104a and an annular slot 104b.

Please refer to FIGS. 1 to 5, the pressing buckle 202 of the plug 20 includes a pressing boss 202a, a buckle 202b, and elastic resetting members 202c. The elastic resetting members 202c are located on both sides of the pressing buckle 202, and two elastic resetting members 202c are provided, which are symmetrically arranged in a "Z" shape to the center of pressing buckle 202.

Please refer to FIG. 1, the protective back cover 210 of the plug 20 includes a ridge portion 210a and a hexagonal portion 210b.

Please refer to FIG. 1 and FIG. 2, the socket body 101, the mounting flange 102, the electrical isolation groove 103, the fastening ring 104 and the pin 105 of the socket 10 are integrally formed, and then assembled with the anti-electric shock cap 106 after being integrally formed.

Please refer to FIG. 1 and FIG. 2, the plug body 201, the pressing buckle 202, the hand-held pluggable portion 203, the hammering boss 204, the hole 205, the crown spring 206 and the wiring cup opening 207 of the plug 20 are integrally formed, which, after being integrally formed, are assembled with the locking slider 208, the waterproof lock washer 209, and the protective rear cover 210.

Please refer to FIGS. 1 to 5, the pressing buckle 202 and the locking slider 208 of the plug 20 and the fastening ring 104 of the socket 10 together form a fastening-locking structure.

Please refer to FIGS. 1 to 5, the pressing buckle 202 of the plug 20 is located on the plug body 201. The locking slider 208 of the plug 20 is slidable in the plug body 201 after the locking slider 208 is assembled. The fastening ring 104 of the socket 10 is located on the outer cylinder of the socket body 101, and the positions of the fastening ring 104 and the anti-electric shock cap 106 are disposed correspondingly.

Please refer to FIGS. 1 to 5, the hole 205 of the plug 20 and the pin 105 of the socket 10 adopt a cylindrical structure respectively and are respectively provided with a circular cross section. The pin 105 and the hole 205 form a rotating shaft after the pin 105 is inserted into the hole 205. The entire plug 20 rotates 360° along the rotating shaft to adjust the outgoing direction of the wire. At the same time, the buckle 202b of the pressing buckle 202 of the plug 20 rotates along the fastening ring 104 of the socket 10.

Please refer to FIG. 1, the electrical isolation groove 103 of the socket 10 is located on the end surface of the socket body 101, and the positions of the electrical isolation groove 103 and the reverse of the anti-electric shock cap 106 are disposed correspondingly. The electrical isolation groove 103 increases the creepage distance, plays a role of electrical safety, and at the same time makes the appearance of the socket 10 better.

Please refer to FIGS. 1 and 2, the anti-electric shock cap 106 of the socket 10 is installed on the end surface of the pin 105, and the positions of the anti-electric shock cap 106 and the fastening ring 104 are disposed correspondingly. The anti-electric shock cap 106 is made of an insulating material. The anti-electric shock cap 106 ensures that the pin 105 of the socket 10 is not contacted with the charged body, the short circuit between the positive electrode and that of the negative electrode of the pin 105 of the socket 10 is not caused by charged body between the positive electrode and that of the negative electrode, and the human body is protected from electric shock.

Please refer to FIGS. 1 to 5, the hand-held pluggable portions 203 of the plug 20 are located on two sides of the plug 20, two hand-held pluggable portions 203 are provided, and one of the two hand-held pluggable portions 203 is provided on the left side of the plug 20, the other is provided on the right side of the plug 20. The hand-held pluggable portions 203 increase the force area of hand grip and provide a better force point, which facilitates using fingers to insert and pull the plug 20, rather than relying solely on the friction generated between the fingers and the plug 20 for plugging. Moreover, the plug 20 is more aesthetic.

Figure 4:
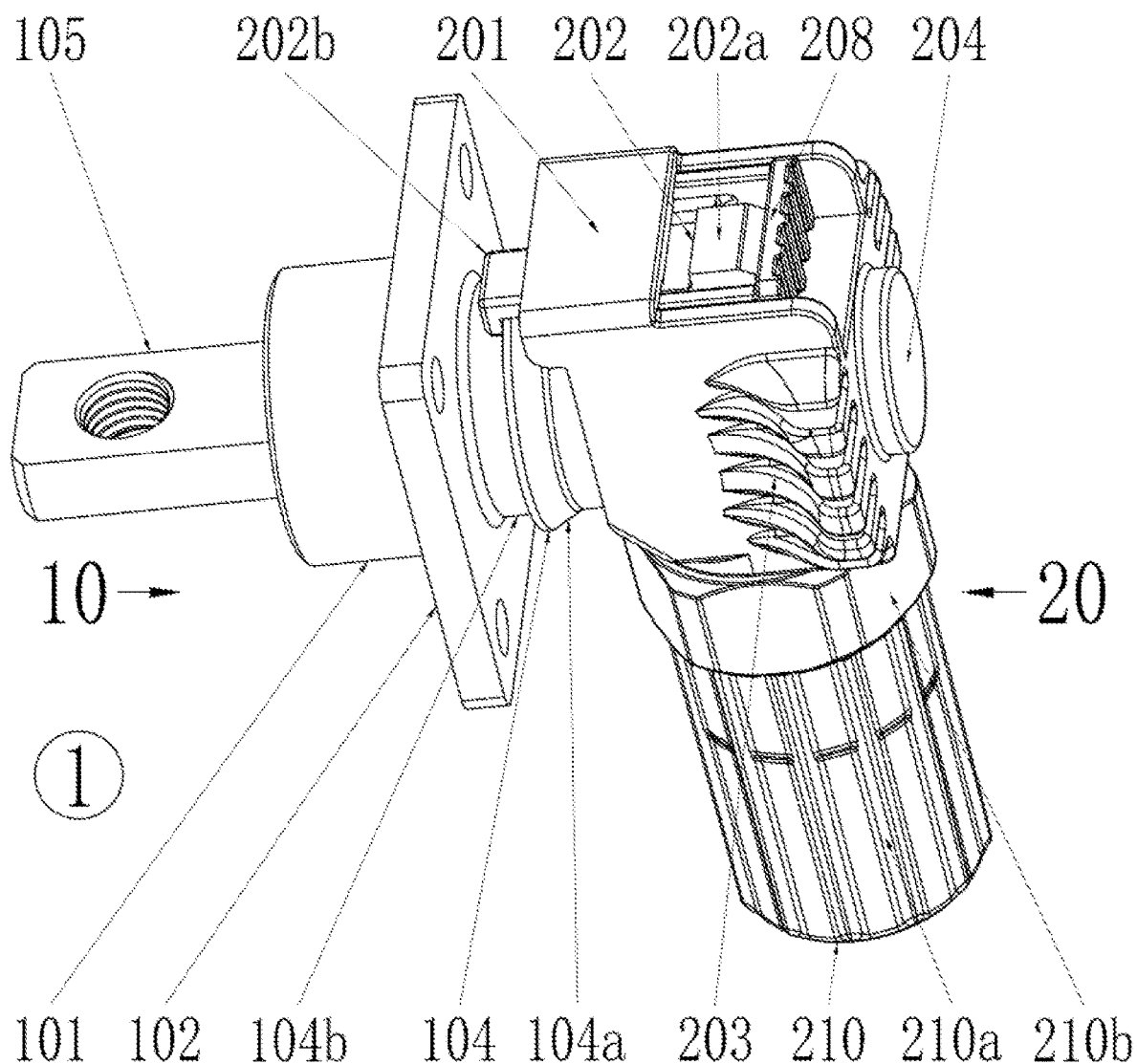
FIG. 4 is a perspective view in a working state of a high-voltage connector for energy storage of the present application.
Figure 5:
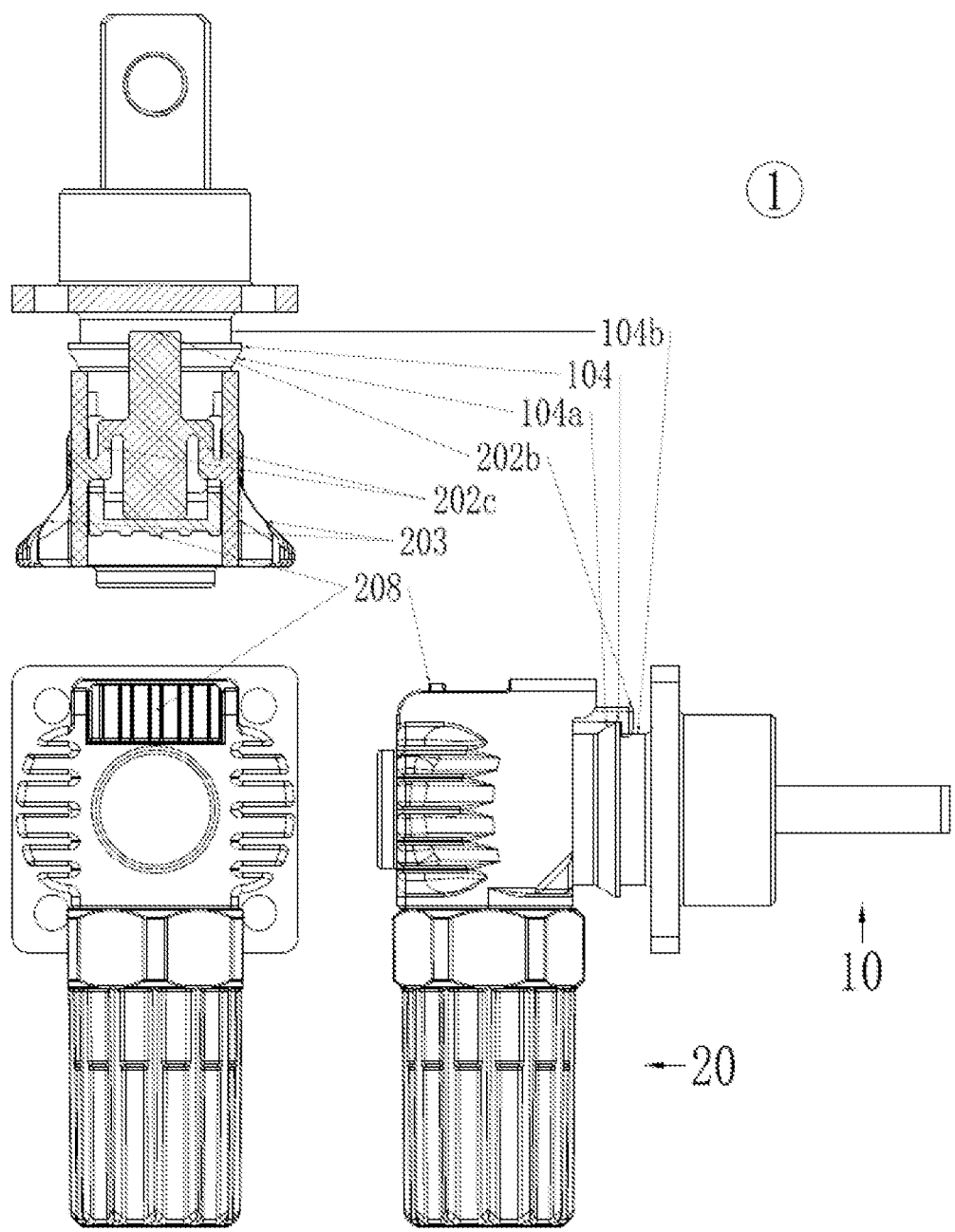
FIG. 5 is a plan three-plan view and a cross-sectional view in a working state of a high-voltage connector for energy storage of the present application.

Please refer to FIG. 2 and FIG. 4, the hammering boss 204 of the plug 20 is located on the end surface of the plug body 201 and the position of the hammering boss 204 is opposite to the hole 205. The plugging between the plug 20 and the socket 10 can be performed by hammering, that is, the hammering boss 204 of the plug 20 is hammered and locked toward the socket 10 with a blunt tool such as a hammer, so that the hole 205 of the plug 20 can be inserted and buckled to the pin 105 of the socket 10, and at the same time, the pressing buckle 202 of the plug 20 is locked and buckled to the fastening ring 104 of the socket 10 through the buckle 202b.

Please refer to FIG. 1, the waterproof lock washer 209 of the plug 20 is installed in the groove of the outer cylinder between the hand-held pluggable portions 203 of the plug 20 and the external thread of the plug body 201. The waterproof lock washer 209 is waterproof and anti-loosening between the plug main body 201 and the protective back cover 210.

Referring to FIG. 1, the interior of the hexagonal part 210b of the protective back cover 210 of the plug 20 is provided with internal threads, the internal threads of the protective back cover 210 is threadedly connected with the external threads of the plug body 201, and the protective back cover 210 is installed and locked to the plug body 201. The protective back cover 210 has two fastening methods. The first fastening method is that the ridge portion 210a is locked by hand tightening, and the second fastening method is that the hexagonal portion 210b is locked with a wrench or other tools. When the protective back cover 210 is being locked, the first fastening method, namely, hand-tightening, is preferred, and the second fastening method, namely, tool-fastening is used when the hand-tightening is not too tight.

Referring to FIG. 1, the plug 20 is separated from the wire, the cost of the connector is low, the length of the wire is not necessary very accurate, and the after-sales service is more convenient. The wiring cup opening 207 of the plug 20 is used for connecting wires. Firstly, the wire is inserted into the connection cup opening 207, then the wire production equipment or hydraulic tools are used to press the connection cup opening 207 into a hexagon, and then the connection cup opening 207 are wrapped with insulating tape or heat shrinkable tubing to make the connection cup opening 207 and the wire tightly integrated, that is, the plug 20 and the wire are integratedly formed.

Please refer to FIGS. 1 to 5, the installation and working principle of the high-voltage connector for energy storage 1 are introduced by combining the above content:

1. Preparation:
1.1. The Plug 20 is Integrated with the Wire:
1.1.1. The Wiring Cup Opening 207 is Integrated with the Wire:

Firstly, insert the wire into the wiring cup opening 207 of the plug 20, then use wire production equipment or hydraulic tools to press the wiring cup opening 207 into a hexagon, and then wrap the wiring cup opening with insulating tape or heat shrink tubing to make the wiring cup opening 207 and the wire tightly integrated.

1.1.2. The Protective Back Cover 210 is Integrated with the Wire:

The internal thread of the protective back cover 210 is screwed with the external thread of the plug main body 201 by hand screwing or using tools such as a wrench which enable the protective back cover 210 to be installed and locked to the plug main body 201, so that the protective back cover 210 of the plug 20 is integrated with the wire.

1.2. Install Socket 10:

Firstly, install the socket 10 to the front panel of the box, and then lock the screws with the four through holes in the mounting flange 102 of the socket 10.

2. Plugging:
2.1. Pull the Locking Slider 208:

The locking slider 208 of the plug 20 is pulled from the socket 10 toward the plug 20 to slide the locking slider 208 away from the pressing boss 202a.

2.2. Plug-In Buckling (Electrical Connection):

The hole 205 of the plug 20 is inserted into the pin 105 of the socket 10 and is engaged with the pin 105 of the socket 10 in an interference fit through the crown spring 206, which is an electrical connection.

2.3. Fastening Buckling:

The pressing buckle 202 of the plug 20 is contacted to the annular bevel 104a of the fastening ring 104 of the socket 10 through the buckle 202b, and the annular bevel 104a exerts a force on the buckle 202b, so that the buckle 202b rotates toward the plug body 201 with the elastic resetting member 202c as the rotation axis. When the buckle 202b is snapped into the annular slot 104b of the fastening ring 104, the pressing buckle 202 is restored to its original shape by the elastic deformation of the elastic resetting member 202c. At this time, the buckle 202b is locked and fastened to the fastening ring 104 to prevent the connector 1 from loosening.

2.4. Locking Buckling (Push the Locking Slider 208):

The locking slider 208 of the plug 20 is pushed from the plug 20 to the socket 10, which enables the locking slider 208 to slide close to the pressing boss 202a. When the pressing boss 202a is accidentally pressed toward the wire, since the pressing boss 202a is blocked and supported by the locking slider 208, the pressing boss 202a cannot rotate toward the wire with the elastic reset 202c as the rotation axis. On this occasion, the locking buckle 202b is fastening buckled and further locking buckled to the fastening ring 104 again to prevent accidental pressing of the pressing boss 202a, and to further prevent the connector 1 from loosening.

2.5. Rotate to Adjust the Outgoing Direction of the Plug 20:

The pin 105 of the socket 10 is inserted in to the hole 205 of the plug 20 to form a rotating shaft, and the entire plug 20 and the wire are rotated 360° along the rotating shaft to adjust the outgoing direction of the plug 20.

3. Separation:
3.1. Locking Separation (Pull the Locking Slider 208):

The locking slider 208 of the plug 20 is pulled from the socket 10 toward the plug 20 to enable the locking slider 208 to slide away from the pressing boss 202a.

3.2. Fastening Separation:

Press the pressing boss 202a of the pressing buckle 202 of the plug 20 toward the wire. Since the pressing boss 202a is not blocked and supported by the locking slider 208, the pressing boss 202a rotates toward the wire with the elastic reset 202c as the rotation axis. Under the action of the elastic deformation of the elastic reset 202c to the pressing buckle 202, the buckle 202b rotates toward the plug body 201 with the elastic reset 202c as the rotation axis, and the buckle 202b is separated from the annular slot 104b. On this occasion, the buckle 202b is separated from the fastening ring 104.

3.3. Plug-In Separation:

The hole 205 of the plug 20 is separated from the pin 105 of the socket 10 through the crown spring 206.

Where the plug-in can also be a combination of item 2.2 (Plug-in buckling) and item 2.3 (fastening buckling), that is, the plug-in can be replaced by hammering to plug in. The specific plug-in is to hammer and lock the hammering boss 204 of the plug 20 toward the socket 10 with a blunt tool such as a hammer, so that the hole 205 of the plug 20 can be plugged into the pin 105 of the socket 10 and buckled to the pin 105 of the socket 10. At the same time, the pressing buckle 202 of the plug 20 is locked and buckled to the fastening ring 104 of the socket 10 through the buckle 202b.

Compared with related art, this present application has at least the following advantages:

By optimizing the socket 10 and the plug 20, an anti-electric shock high-voltage connector for energy storage is provided, which is provided with a fastening-locking structure, a plug 20 having a hand-held plug-in position structure, capable of rotating 360° to adjust the wire outgoing direction, and separated from the wire. The socket 10 is more securely connected to the plug 20 to avoid loosening between the socket 10 and the plug 20.

What is claimed is:

1. A high-voltage connector for energy storage, comprising:
   a socket, wherein the socket comprises a socket body, a mounting flange, an electrical isolation groove, a fastening ring, a pin and an anti-electric shock cap, and the fastening ring of the socket comprises an annular bevel and an annular slot;
   a plug, wherein the plug comprises a plug body, a pressing buckle, hand-held pluggable portions, a hammering boss, a hole, a crown spring, a wiring cup opening, and a locking slider, a waterproof lock washer and a protective back cover, the pressing buckle of the plug comprises a pressing boss, a buckle, and an elastic resetting member, the protective back cover of the plug comprises a ridge portion and a hexagonal portion;
   wherein the socket body, the mounting flange, the electrical isolation groove, the fastening ring and the pin of the socket are integrally formed, and after being integrally formed, are assembled with the anti-electric shock cap;

wherein the plug body, the pressing buckle, the hand-held pluggable portion, the hammering boss, the hole, the crown spring and the wiring cup opening of the plug are integrally formed, and after being integrally formed, are assembled with the locking slider, the waterproof lock washer, and the protective rear cover;

wherein the pressing buckle of the plug, the locking slider, and the fastening ring of the socket together form a fastening-locking structure;

wherein the pressing buckle of the plug is located on the plug body, the locking slider of the plug is configured to be slidable in the plug body after being installed, the fastening ring of the socket is located on an outer cylinder of the socket body, and positions of the fastening ring and the anti-electric shock cap are disposed correspondingly.

2. The high-voltage connector for energy storage according to claim 1, wherein the hole of the plug and the pin of the socket adopt a cylindrical structure respectively and are respectively provided with a circular cross section.

3. The high-voltage connector for energy storage according to claim 1, wherein the electrical isolation groove of the socket is located on an end surface of the socket body, and a position of the electrical isolation groove is opposite to the anti-electric shock cap.

4. The high-voltage connector for energy storage according to claim 1, wherein the anti-electric shock cap of the socket is installed on an end surface of the pin, and positions of the anti-electric shock cap and the fastening ring are disposed correspondingly.

5. The high-voltage connector for energy storage according to claim 4, wherein the hand-held pluggable portions of the plug are located on two sides of the plug, two hand-held pluggable portions are provided, and one of the two hand-held pluggable portions is located on a left side of the plug, another of the two hand-held pluggable portions is located on a right side of the plug.

6. The high-voltage connector for energy storage according to claim 1, wherein the hammering boss of the plug is located on an end surface of the plug body and a position of the hammering boss is opposed to the hole.

7. The high-voltage connector for energy storage according to claim 1, wherein the waterproof lock washer of the plug is installed in a groove of the outer cylinder between the hand-held pluggable portions of the plug and external threads of the plug body.

8. The high-voltage connector for energy storage according to claim 1, wherein an interior of the hexagonal portion of the protective back cover of the plug is provided with internal threads, and the internal threads of the protective back cover is threadedly connected with external threads of the plug body, and the protective back cover is installed and locked to the plug body.

9. The high-voltage connector for energy storage according to claim 1, wherein the plug is separated from a wire, and the wire is inserted into an inside of the wiring cup opening and pressed tightly to enable the plug to be integrated with the wire.

* * * * *